F. H. HEADEN.
FEED REGULATOR.
APPLICATION FILED NOV. 29, 1909.

996,760.

Patented July 4, 1911.

Witnesses:
Chas E. Reed
Thos V. Fansher

Frank H. Headen.
Inventor

UNITED STATES PATENT OFFICE.

FRANK H. HEADEN, OF EAST ST. LOUIS, ILLINOIS.

FEED-REGULATOR.

996,760.  Specification of Letters Patent.  Patented July 4, 1911.

Application filed November 29, 1909. Serial No. 530,425.

*To all whom it may concern:*

Be it known that I, FRANK H. HEADEN, a citizen of the United States, residing at East St. Louis, in the county of St. Clair and State of Illinois, have invented certain new and useful Improvements in Feed-Regulators, of which the following is a specification.

Figure 1:
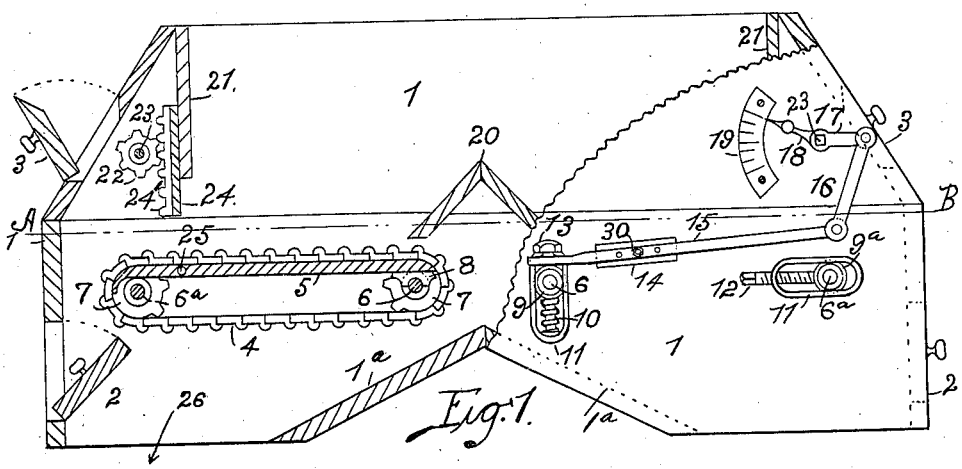
Figure 3:
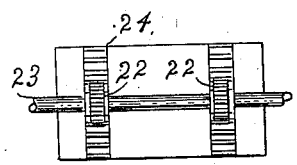
Figure 2:
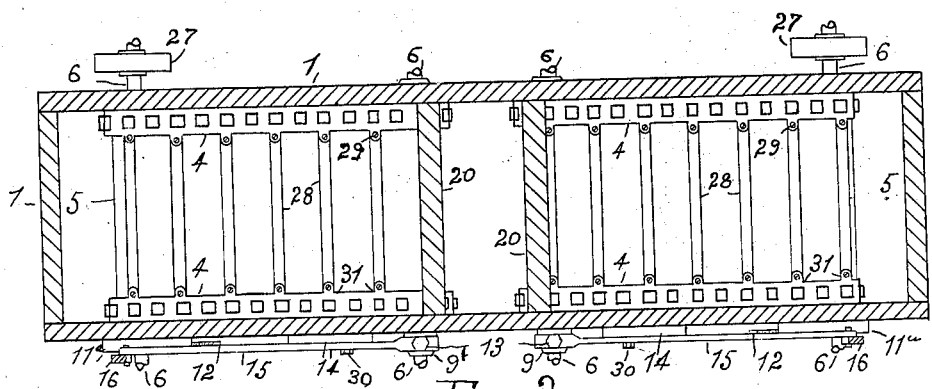

My invention relates to a feed regulator. The main object of the invention is to provide a feed regulator in which the flow of material will be automatically and accurately regulated by the weight of the descending material upon an endless yielding carrier which in turn controls the feed gate or outlet. This object I attain by the mechanism illustrated in the accompanying drawing in which:

Figure 1 is a sectional side elevation of a feed regulator containing my improvements; Fig. 2 is a horizontal section on line A—B, Fig. 1; Fig. 3 is a detail elevation of one of the feed gates and its operating gearing.

The framework of the machine is in the form of a substantially rectangular hopper or casing 1, closed at its sides and inclined ends, provided across its middle with an Λ shaped guard or partition 20, and provided therebelow with a similar wider partition 1ª. Between the lower edges of the partition 1ª and the ends of the hopper or casing are the outlets 26, 26, for the material being fed. The ends of the hopper or casing, 1, are provided with feed gate supports 21 to be hereinafter referred to.

In its preferred form, the feed regulator is illustrated as double with two oppositely moving endless feeders or carriers and as these are alike, a detailed description of one will suffice. Each endless feeder or carrier comprises a pair of shafts 6, 6ª, both provided with a pair of sprocket wheels 7, 7, around which passes the endless feeder or carrier in the form of connected links or chains 4, certain of which links are provided with lugs 31, to which are secured by screws or bolts 29, the ends of the cross slats or flights 28 which feed the material along the table or board 5. This table or board 5 is pivoted near its outer end at 25 below the gate support 21, to the hopper or casing, 1, and at the inner end is provided with bearings 8 which rest upon the shaft 6. The carriers or feeders together with their tables 5 form the bottom of the hopper and also feed the material therefrom. The shafts 6, 6, are both journaled in vertically sliding boxes or bearings 9, mounted to slide in guide ways or slots 11, in the sides of hopper, 1, below the opposite edges of the guard 20. The boxes or bearings 9, are yieldingly supported by the springs, 10, 10, as shown in Fig. 1. The outer shafts 6ª, 6ª, are journaled in horizontally adjustable bearings 9ª provided with adjusting screws 12, 12, by means of which the tautness of the endless carriers or feeders 4, 4, may be adjusted.

The several shafts are provided with belt driven pulleys 27 and the upper runs of the endless carriers move outwardly to feed the material in opposite direction toward the ends of the hopper 1.

The vertically sliding gates 24 are mounted on the supports 21, above the delivery ends of the feeders 4, and are provided with racks 24′ engaged by pinions 22, on transverse rock shafts 23. One end of each shaft 23 carries a pointer 18, operating over a scale 19, and an oppositely projecting actuating arm 17. The arms 17, of the two shafts 23, are connected by links 16, with the outer ends of longitudinally extending levers 15, pivoted at 30, to plates 14, and pivotally connected at their inner shorter ends to the upper ends of the yielding boxes 9, 9, so that as the boxes 9, 9, together with the inner ends of the endless carriers 4, 4, move down and up a like movement will be imparted to the gates 24, 24, through the lever mechanism and pinions 22 just described.

Doors 3, 3, are provided in the ends of the hopper above the discharge ends of the endless feeders 4 to allow the flow of the material to be observed. A second pair of doors 2, 2, are hinged at their lower edges to swing inwardly at their upper edges under the discharge end of the belts, so that portions of the material being fed may be withdrawn from time to time for observation.

What I claim is:—

1. A feed regulator comprising a hopper or casing provided with a feed gate, a vertically yielding horizontally disposed carrier forming the bottom of the hopper or casing and feeding the material toward the gate, and operative connections between the yielding carrier and the feed gate for adjusting the latter.

2. A feed regulator comprising a hopper or casing provided with a feed gate, a vertically yielding horizontally disposed endless carrier forming the bottom of the hopper or casing and feeding the material toward the gate, and operative connections between the yielding carrier and the feed gate for actuating the latter.

3. A feed regulator comprising a hopper or casing provided with a feed gate, a vertically yielding horizontally disposed endless carrier pivoted near its discharge end below the gate and forming the bottom of the hopper, and operative connections between the inner free end of the carrier and the said gate for actuating the latter.

4. A feed regulator comprising a hopper having a feed gate, a yielding feeder in the hopper on which the material rests, means for actuating the feeder by which the material is positively fed past the gate, and operative connections independent of said actuating means between the feeder and the gate whereby the weight of material on the feeder will cause it to actuate and control the gate.

5. A feed regulator comprising a hopper having a vertically movable feed gate, a shaft and gearing for actuating the gate, a pointer on one end of the shaft, a scale therefor, an endless carrier extending at its discharge end under the gate and yieldingly supported at its opposite end, and a lever connected at one end with the yielding end of the carrier and operatively connected at its opposite end to the gate actuating shaft.

6. A feed regulator comprising a hopper, feed gates at opposite ends of the hopper, oppositely operating endless carriers extending from the middle of the hopper with their discharge ends under the said gates; said carriers being yieldingly supported at their inner ends to yield under the weight of the material, a guard over the inner ends of the carriers, and operative connections between the yielding ends of the carriers and the said feed gates for controlling the latter.

7. A feed regulator comprising a hopper provided at one end with a feed gate having operating gearing, an endless carrier formed of links and cross slats, shafts having sprocket wheels; the inner shaft being supported to yield vertically, a table within the carrier, pivoted at its outer end and supported at the inner end on said yielding shaft, and a lever mechanism actuated from the yielding end of said carrier and operatively connected to the gate gearing.

FRANK H. HEADEN.

Witnesses:
THOMAS V. FANSHER,
CHAS. E. REID.